United States Patent
Fukuda

(10) Patent No.: US 12,432,446 B2
(45) Date of Patent: Sep. 30, 2025

(54) APPARATUS, ITS CONTROL METHOD, AND STORAGE MEDIUM

(71) Applicant: CANON KABUSHIKI KAISHA, Tokyo (JP)

(72) Inventor: Kyohei Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 17/749,906

(22) Filed: May 20, 2022

(65) Prior Publication Data

US 2022/0385801 A1 Dec. 1, 2022

(30) Foreign Application Priority Data

May 25, 2021 (JP) ................. 2021-087551

(51) Int. Cl.
*H04N 23/67* (2023.01)
*G03B 3/10* (2021.01)
*G03B 13/34* (2021.01)

(52) U.S. Cl.
CPC ............. *H04N 23/67* (2023.01); *G03B 3/10* (2013.01); *G03B 13/34* (2013.01)

(58) Field of Classification Search
CPC ............. H04N 23/67; H04N 23/673; H04N 23/631–633; H04N 25/42; H04N 23/663; H04N 23/633; G03B 3/10; G03B 13/34; G03B 2206/00; G03B 5/00; G03B 17/14; G03B 13/32; G03B 13/36; G03B 13/00; G03B 13/16; G03B 13/18; G03B 13/20; G03B 13/22; G03B 13/24; G03B 2213/00; G03B 5/02
See application file for complete search history.

(56) References Cited

U.S. PATENT DOCUMENTS

| | | | |
|---|---|---|---|
| 2011/0001867 A1* | 1/2011 | Takahashi | G02B 7/10 348/E5.045 |
| 2012/0287328 A1* | 11/2012 | Kawai | G03B 3/10 348/E5.042 |
| 2016/0116824 A1* | 4/2016 | Okawa | G03B 3/10 396/133 |
| 2016/0320588 A1* | 11/2016 | Kindaichi | H04N 23/663 |
| 2021/0356842 A1* | 11/2021 | Shingu | G03B 13/36 |

FOREIGN PATENT DOCUMENTS

| | | |
|---|---|---|
| JP | 2003177294 A | 6/2003 |
| JP | 2015-126418 A | 7/2015 |
| JP | 2019-040044 A | 3/2019 |

* cited by examiner

*Primary Examiner* — John W Miller
*Assistant Examiner* — Humam M Satti
(74) *Attorney, Agent, or Firm* — Canon U.S.A., Inc. IP Division

(57) ABSTRACT

An apparatus includes a first operation member, an assigning unit configured to assign one of a plurality of functions to the first operation member, and a second operation member configured to enable a user to provide a setting relating to a specific function among the plurality of functions. The assigning unit assigns the specific function to the first operation member according to an operation of the second operation member.

19 Claims, 5 Drawing Sheets

| FUNCTION ASSIGNABLE TO ROTATIONAL OPERATION UNIT ||
| BEFORE FOCUS LENS SENSITIVITY IS CHANGED | AFTER FOCUS LENS SENSITIVITY IS CHANGED |
| --- | --- |
| DIAPHRAGM OPERATION | FOCUSING |
| FOCUSING | FOCUSING |
| ISO OPERATION | FOCUSING |
| WB OPERATION | FOCUSING |

| FUNCTION ASSIGNABLE TO ROTATIONAL OPERATION UNIT | | |
|---|---|---|
| BEFORE CHANGE | AF → MF | MF → AF |
| DIAPHRAGM OPERATION | FOCUSING | DIAPHRAGM OPERATION |
| FOCUSING | FOCUSING | FUNCTION THAT WAS ASSIGNED BEFORE FOCUSING |
| ISO OPERATION | FOCUSING | ISO OPERATION |
| WB OPERATION | FOCUSING | WB OPERATION |

APPARATUS, ITS CONTROL METHOD, AND STORAGE MEDIUM

BACKGROUND

Technical Field

The aspect of the embodiments relates to an optical apparatus such as a lens apparatus and an image pickup apparatus.

Description of the Related Art

Some lens apparatuses and image pickup apparatuses include an operation member (operation ring) which is rotationally operable by a user and provided on an outer circumference of a lens barrel. Moreover, to some operation rings, one of a plurality of functions, such as a manual focus (MF) function, an F-number (aperture value) adjusting function, and a shutter speed adjusting function, may be selectively assigned.

Japanese Patent Laid-Open No. ("JP") 2019-040044 discloses an image pickup apparatus mounted with an interchangeable lens and configured to change a function of an operation member that is provided in the image pickup apparatus according to a type of the mounted interchangeable lens. JP 2015-126418 discloses an image pickup apparatus configured to change a function of an operation member provided on a lens barrel according to a set imaging mode.

The image pickup apparatuses disclosed in JPs 2019-040044 and 2015-126418 automatically assign a function to the operation member having a variable function according to the mounted interchangeable lens or the set imaging mode, and thus a user has no burden when the function is assigned to the operation member.

However, in a case where the function of the operation ring is arbitrarily selectable by the user and there is another operation member for providing a setting relating to the selected function, the user is to arduously perform an operation for selecting the function of the operation ring and for performing an operation of the setting relating to the function.

SUMMARY

An apparatus according to one aspect of the embodiments includes a first operation member, an assigning unit configured to assign one of a plurality of functions to the first operation member, and a second operation member configured to enable a user to provide a setting relating to a specific function among the plurality of functions. The assigning unit assigns the specific function to the first operation member according to an operation of the second operation member.

A lens apparatus according to another aspect of the embodiments includes a first operation member, and a second operation member configured to enable a user to provide a setting relating to a specific function among a plurality of functions, and a control unit configured to provide control relating to the specific function based on an operating amount of the first operation member according to an operation of the second operation member.

An image pickup apparatus according to another aspect of the embodiments attachable to and detachable from a lens apparatus that includes a first operation member, and a second operation member configured to enable the user to provide a setting relating to a specific function among a plurality of functions includes a control unit configured to assign the specific function to the first operation member according to an operation of the second operation member.

A method of an apparatus according to another aspect of the embodiments includes a first operation member and a second operation member includes assigning one of a plurality of functions to the first operation member, and determining an operation of the second operation member configured to enable a user to provide a setting relating to a specific function among the plurality of functions. The assigning assigns the specific function to the first operation member according to the operation of the second operation member.

A non-transitory computer-readable storage medium storing a computer program that causes a computer to execute the above control method also constitutes another aspect of the embodiments.

Further features of the will become apparent from the following description of exemplary embodiments with reference to the attached drawings.

DESCRIPTION OF THE EMBODIMENTS

Referring now to the accompanying drawings, a description will be given of embodiments according to the disclosure.

First Embodiment

Figure 1:
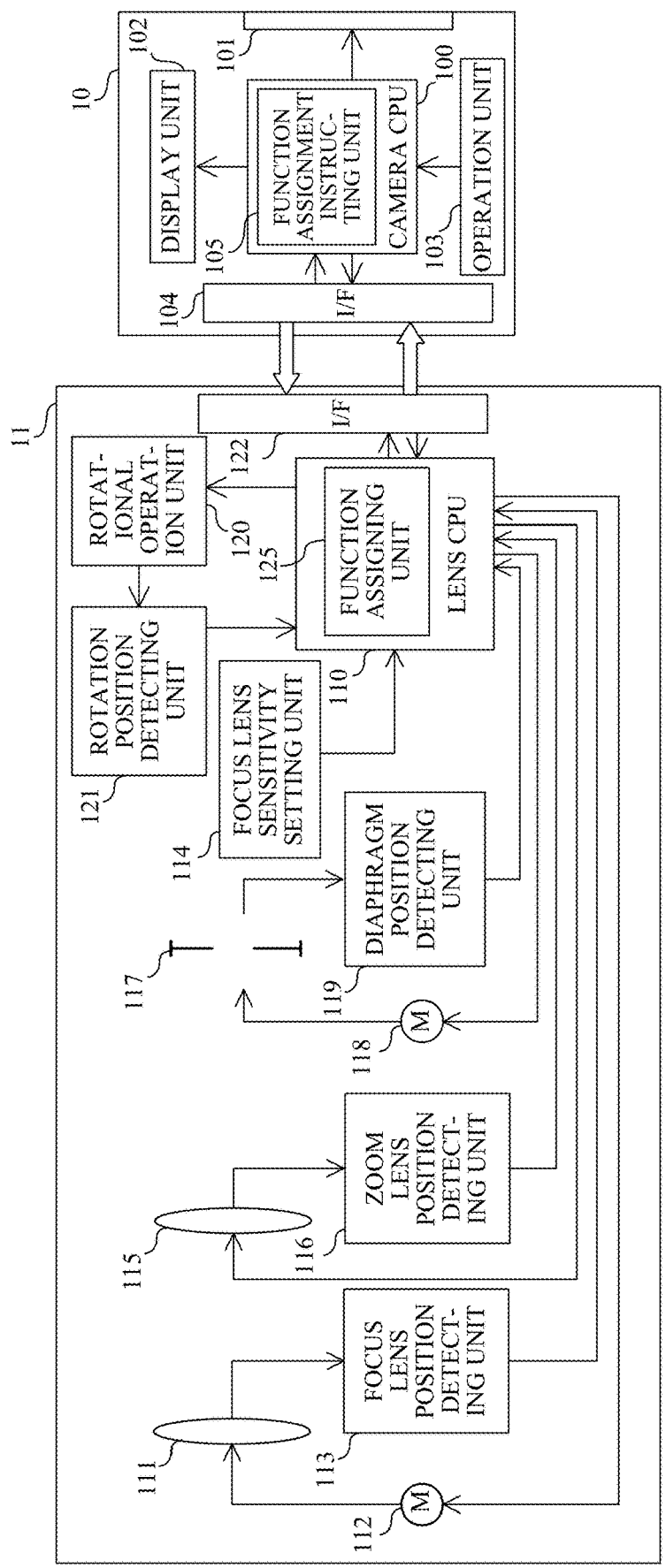
FIG. 1 is a block diagram illustrating a configuration of a camera system according to a first embodiment.

FIG. 1 illustrates a configuration of a camera system including an interchangeable lens (lens apparatus) 11 as an optical apparatus according to a first embodiment of the disclosure. The camera system includes an interchangeable lens 11 and a camera body (image pickup apparatus) 10 attachable to and detachable from the interchangeable lens 11.

In the camera body 10, a camera CPU 100 controls the operation of the entire camera body 10 such as accepting input from an operation unit 103, displaying information on a display unit 102, driving an image sensor 101, and communicating with the interchangeable lens 11. The image sensor 101 is a photoelectric conversion element such as a CMOS sensor, and converts an optical image formed by a light beam that has passed through an imaging lens (imaging optical system) in the interchangeable lens 11, into an electric signal.

The display unit 102 includes a display device such as a liquid crystal display, and displays (presents to the user or informs the user of) information input from the operation unit 103 and an image generated by imaging through the image sensor 101. The operation unit 103 includes operation members such as a switch, a dial, and a touch sensor provided on the display unit 102, and transmits input generated by the user's operation to the operation member to the camera CPU 100. A camera communication I/F unit 104 is an interface for the camera CPU 100 and the interchangeable lens 11 to communicate with each other, in cooperation with a lens communication I/F unit 122 provided on the interchangeable lens 11.

A function assignment instructing unit 105 in the camera CPU 100 instructs (informs) the interchangeable lens 11 on (of) a function to be assigned to a rotational operation unit 120 as the first operation member provided to the interchangeable lens 11 based on the input from the operation unit 103.

In the interchangeable lens 11, the rotational operation unit 120 includes a ring member that is provided on the outer circumference of the lens barrel that includes the imaging lens so that the user can rotationally operate the lens barrel around the lens barrel. A lens CPU 110 controls the entire operation of the interchangeable lens 11, such as communicating with the camera body 10, detecting a position of each lens, generating a driving command, and processing operation information on the rotational operation unit 120 and setting information on a focus lens sensitivity setting unit 114 described below. A rotation position detecting unit 121 detects a rotation position of the rotational operation unit 120, and transmits information on the rotation position to the lens CPU 110. The lens CPU 110 can acquire an operating amount (rotating amount) of the rotational operation unit 120 from a changing amount of the rotation position.

The imaging lens includes a focus lens 111, a zoom lens 115, a diaphragm (aperture stop) 17, and an unillustrated fixed lens. The focus lens 111 is movable in an optical axis direction during focusing of the imaging lens. A focus lens driving motor 112 is an actuator for moving the focus lens 111 in the optical axis direction. The lens CPU 110 controls the driving of the focus lens driving motor 112 according to the operation of the rotational operation unit 120 when the rotational operation unit 120 is assigned a focusing function described below. Thereby, the focus lens 111 is moved according to the operation of the rotational operation unit 120. A focus lens position detecting unit 113 includes an encoder or the like, and detects the position of the focus lens 111 in the optical axis direction.

The zoom lens 115 is movable in the optical axis direction to change a focal length of the imaging lens. An unillustrated zooming ring rotationally operable by the user around the lens barrel is provided separately from the rotational operation unit 120 on the outer circumference of the lens barrel. When the zooming ring is operated, its rotation is mechanically transmitted to the zoom lens 115, and the zoom lens 115 is moved in the optical axis direction. A zoom lens position detecting unit 116 includes an encoder or the like, and detects the position of the zoom lens 115 in the optical axis direction.

The diaphragm 117 adjusts a light amount passing through the imaging lens, by changing an aperture diameter formed by unillustrated diaphragm blades. A diaphragm driving motor 118 is an actuator that drives the diaphragm blades so as to change the aperture diameter of the diaphragm 117. A diaphragm position detecting unit 119 detects positions of the diaphragm blades (that is, the aperture diameter).

One of a plurality of functions can be selectively assigned to the rotational operation unit 120. The plurality of functions include the focusing function for moving the focus lens 111, a diaphragm operation function for changing the aperture diameter of the diaphragm 117, an ISO operation function for changing an ISO speed of the image sensor 101, and a WB operation function for changing the white balance (WB). These functions are merely illustrative, and another function such as a shutter speed operation function for changing the shutter speed of the camera body 10 may be assigned.

A function assigning unit (assigning unit) 125 assigns a function instructed by the function assignment instructing unit 105 among the plurality of functions to the rotational operation unit 120. The function assigning unit 125 assigns the focusing function (specific function) instructed by the function assignment instructing unit 105 to the rotational operation unit 120 according to the operation (change in the focus lens sensitivity) of the focus lens sensitivity setting unit 114 as the second operation member described below.

The focus lens sensitivity setting unit 114 is an operation member for setting the focus lens sensitivity that is a moving amount of the focus lens 111 (focus moving amount) to a rotating amount of the rotational operation unit 120 when the focusing function is assigned to the rotational operation unit 120. Even if the rotating amount of the rotational operation unit 120 is the same, if the focus lens sensitivity is set high, the moving amount of the focus lens 111 becomes large, and if the focus lens sensitivity is set low, the moving amount of the focus lens 111 becomes smaller. The focus lens sensitivity setting unit 114 includes a slide switch, a seesaw switch, a dial, etc., which are different from a rotational operation around the lens barrel, and is provided on a side surface of the lens barrel an operation member different from the rotational operation unit 120. The focus moving amount may be a moving amount of an image plane.

Figures 2, 3:
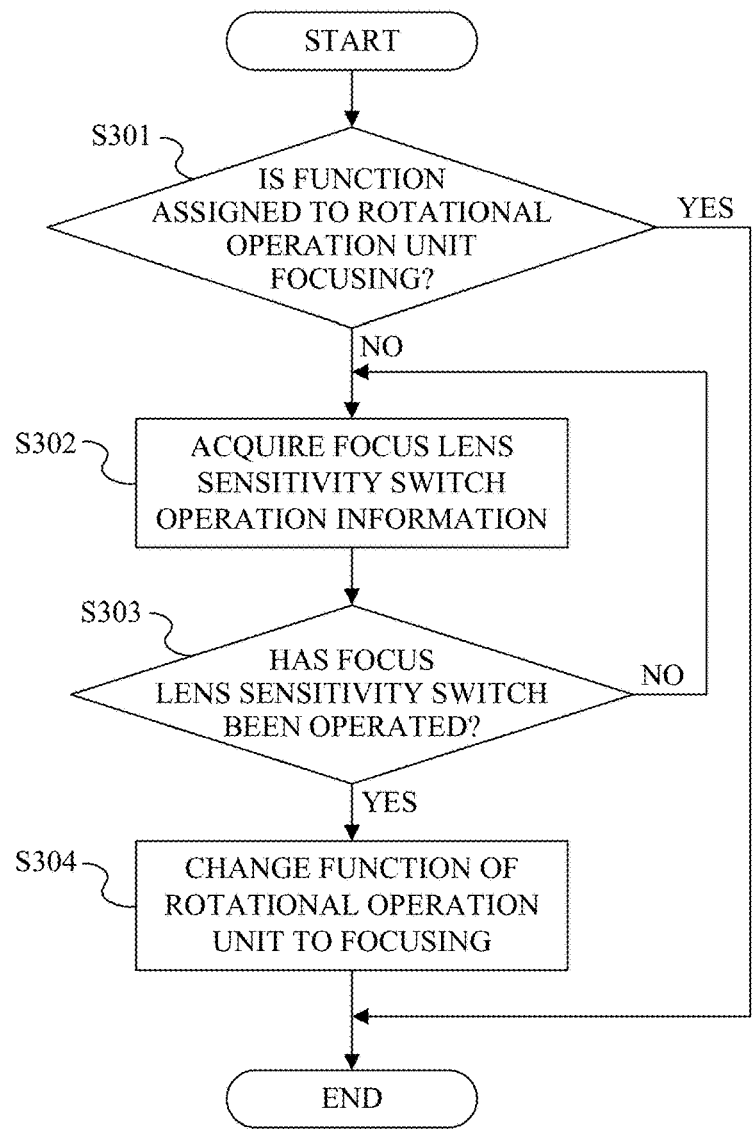
FIG. 2 illustrates a function assigned to an operation unit according to the first embodiment.
FIG. 3 is a flowchart illustrating function assigning processing according to the first embodiment.

A left side of FIG. 2 illustrates functions assignable to the rotational operation unit 120 by the function assignment instructing unit 105 via the function assigning unit 125 before the operation of the focus lens sensitivity setting unit 114 (referred to as sensitivity operation hereinafter). When the sensitivity operation is performed in the case where the diaphragm operation function, the ISO operation function, or the WB operation function is assigned to the rotational operation unit 120, the function assignment instructing unit 105 changes the function assigned to the rotational operation unit 120 to the focusing function as illustrated on a right side of FIG. 2. Upon receiving the instruction to change the function to the focusing function, the function assigning unit 125 assigns the focusing function to the rotational operation unit 120.

In the case where the focusing function has been assigned to the rotational operation unit 120 before the sensitivity operation, the function assignment instructing unit 105 does not change the (focusing) function assigned to the rotational operation unit 120 even if the sensitivity operation is performed.

A flowchart of FIG. 3 illustrates processing (control method) in which the function assignment instructing unit 105 assigns the focusing function to the rotational operation unit 120. The function assignment instructing unit 105 provided in the camera CPU 100 as a computer executes this processing according to a computer program.

In the step S301, the function assignment instructing unit 105 determines whether or not the function currently assigned to the rotational operation unit 120 is the focusing function. In the case where the focusing function is assigned, this processing ends, and in the case where a function other than the focusing function is assigned, the flow proceeds to the step S302.

In the step S302, the function assignment instructing unit 105 acquires the operation information on the focus lens sensitivity setting unit 114 by communicating with the lens CPU 110.

In the step S303, the function assignment instructing unit 105 determines whether or not the operation information on the focus lens sensitivity setting unit 114 has changed, that is, whether or not the sensitivity operation has been performed. In the case where no sensitivity operation has been performed, the flow returns to the step S302, and in the case where the sensitivity operation has been performed, the flow proceeds to the step S304.

In the step S304, the function assignment instructing unit 105 changes the function to be assigned to the rotational operation unit 120 to the focusing function, sends a changing instruction to the focusing function to the function assigning unit 125, and ends this processing. The function assigning unit 125 assigns the focusing function to the rotational operation unit 120.

Figure 4A:
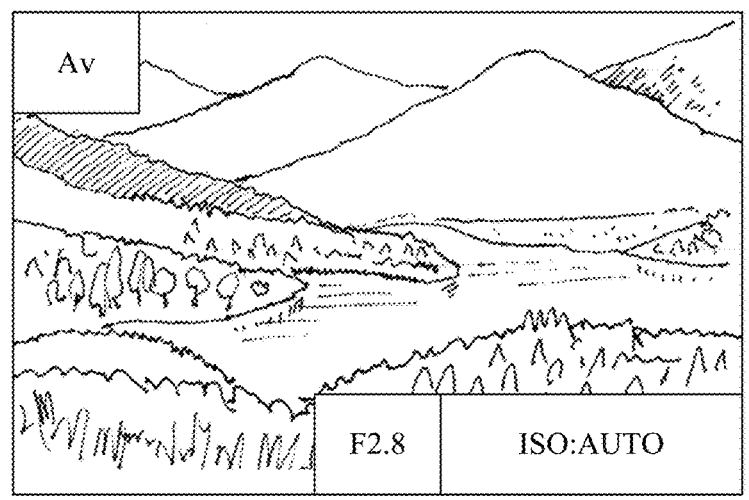
FIGS. 4A to 4C illustrate a display example of a display unit according to the first embodiment.
Figure 4B:
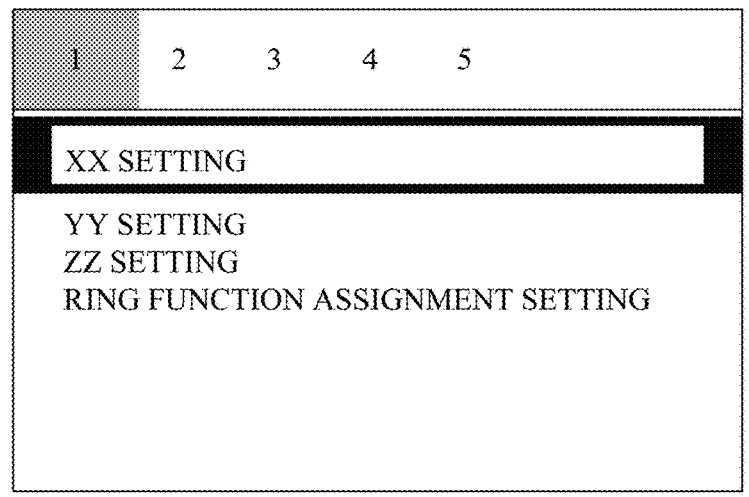
Figure 4C:
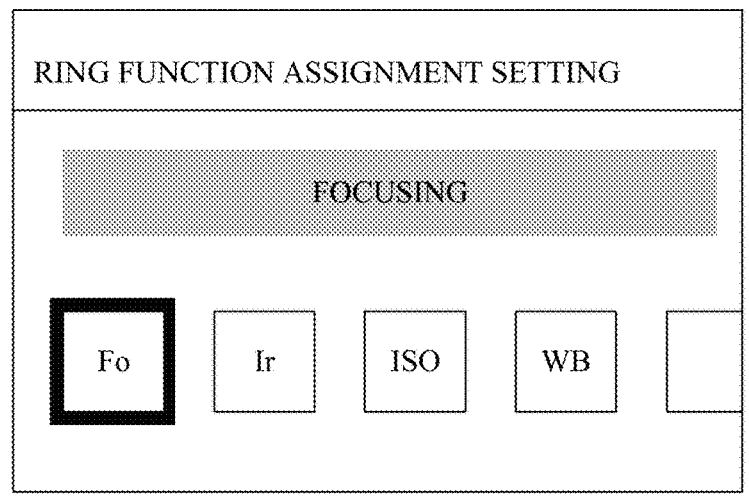

Referring now to FIGS. 4A to 4C, a description will be given of a specific operation when the user selects (changes) the function to be assigned to the rotational operation unit 120. The user operates the operation unit 103 while viewing the information displayed on the display unit 102. The display unit 102 and the operation unit 103 constitute a selecting unit.

FIG. 4A illustrates a live-view display screen displayed on the display unit 102 when the camera body 10 is powered on. From this state, the user operates the operation unit 103 to display a setting menu screen illustrated in FIG. 4B on the display unit 102. Various settings of the camera body 10 and the interchangeable lens 11 can be changed through the setting menu screen. In changing the function to be assigned to the rotational operation unit 120, the user selects "ring function assignment setting" from the setting menu screen through the operation of the operation unit 103. Thereby, the display unit 102 displays a ring function assignment setting screen illustrated in FIG. 4C. The ring function assignment setting screen displays icons for the focusing function (Fo), diaphragm operation function (Ir), ISO operation function (ISO), and WB operation function (WB), and the currently set "focusing" function. The user selects a function to be assigned to the rotational operation unit 120 through the operation of the operation unit 103 on the ring function assignment setting screen. Thereby, the function assignment instructing unit 105 transmits an instruction for assigning the function selected by the user to the function assigning unit 125, and causes the rotational operation unit 120 to assign the function.

When the user operates the focus lens sensitivity setting unit 114, this embodiment automatically assigns the focusing function to the rotational operation unit 120, considering that the user wants to use the manual focus. It is therefore unnecessary for the user to operate the focus lens sensitivity setting unit 114 to set the focus lens sensitivity, or to further operate the operation unit 103 to assign the focusing function to the rotational operation unit 120 through the ring function assignment setting screen. Thus, this embodiment can reduce the operational load of the user.

Second Embodiment

Figure 5:
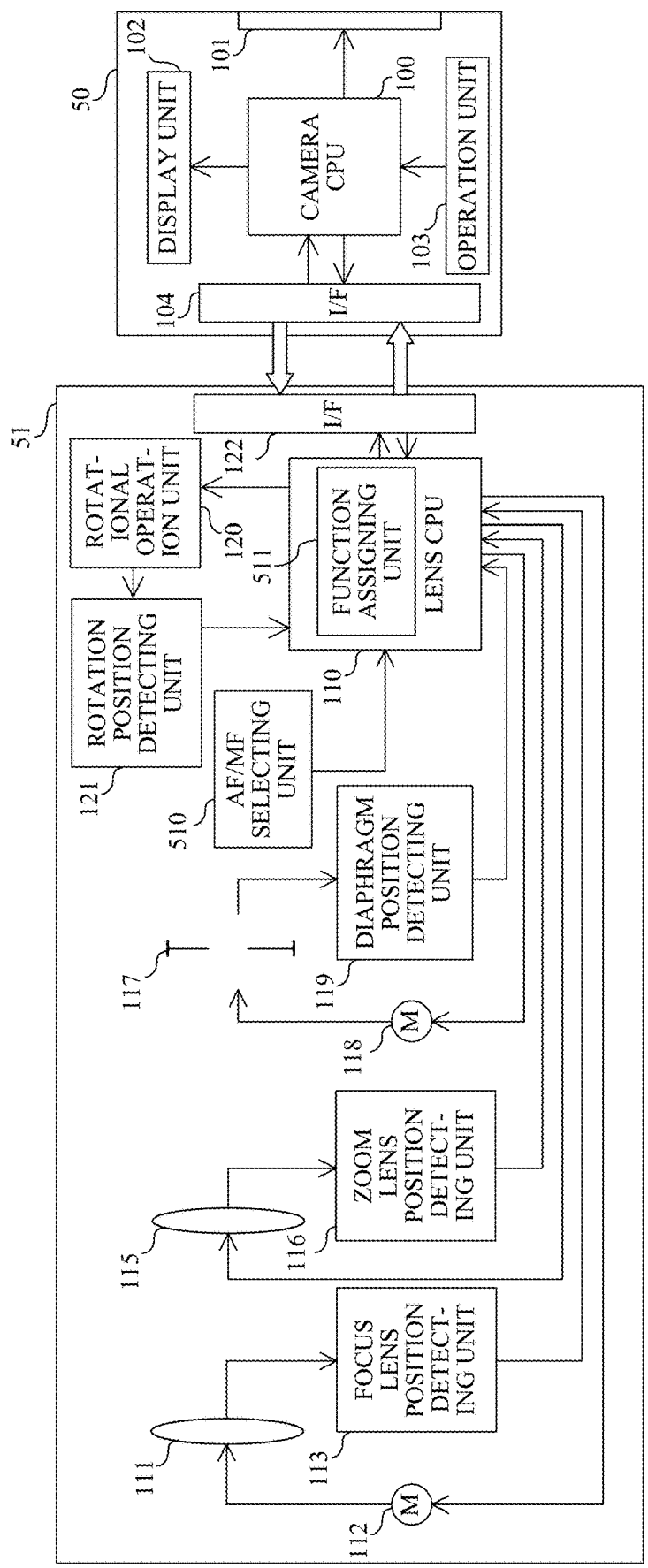
FIG. 5 is a block diagram illustrating a configuration of a camera system according to a second embodiment.

FIG. 5 illustrates a configuration of a camera system that includes an interchangeable lens (lens apparatus) 51 as an optical apparatus according to a second embodiment of the disclosure. The camera system includes the interchangeable lens 51 and a camera body (image pickup apparatus) 50 attachable to and detachable from the interchangeable lens 51. Those elements in FIG. 5, which are corresponding elements in the first embodiment (FIG. 1), will be designated by the same reference numerals as those of the first embodiment, and a description thereof will be omitted.

In the first embodiment, the function assignment instructing unit 105 assigns the focusing function to the rotational operation unit 120 according to the user operation of the focus lens sensitivity setting unit 114. On the other hand, in the second embodiment, a function assigning unit 511 in the lens CPU 110 changes a function to be assigned to the rotational operation unit 120 according to a user operation of an autofocus (AF)/manual focus (MF) selecting unit (second operation member) 510. In this embodiment, the camera CPU 100 of the camera body 50 has no function assignment instructing unit, and information (function selecting information) of the function selected by the user is transmitted from the CPU 100 to the function assigning unit 511 through the display unit 102 and the operation unit 103.

The AF/MF selecting unit 510 is an operation member separate from the rotational operation unit 120, which is operated to select a focus mode (MF or AF) which the user uses. The AF/MF selecting unit 510 includes a slide switch, a seesaw switch, a dial, or the like, and is provided on the side surface of the lens barrel or the like.

In the AF, the camera CPU 100 calculates a defocus amount using a signal acquired from the image sensor 101, calculates a moving amount of the focus lens 111 for obtaining the in-focus state based on the defocus amount, and transmits it to the lens CPU 110. The lens CPU 110 controls the driving of the focus lens driving motor 112 so as to move the focus lens 111 by the received moving amount.

When use of the MF is selected through the AF/MF selecting unit 510, the function assigning unit 511 assigns the focusing function to the rotational operation unit 120. On the other hand, in the case where use of the AF is selected, the function assigning unit 511 assigns to the rotational operation unit 120 a function (diaphragm operation function, ISO operation function or WB operation function) corresponding to the function selecting information received from the camera CPU 100.

Figures 6, 7:
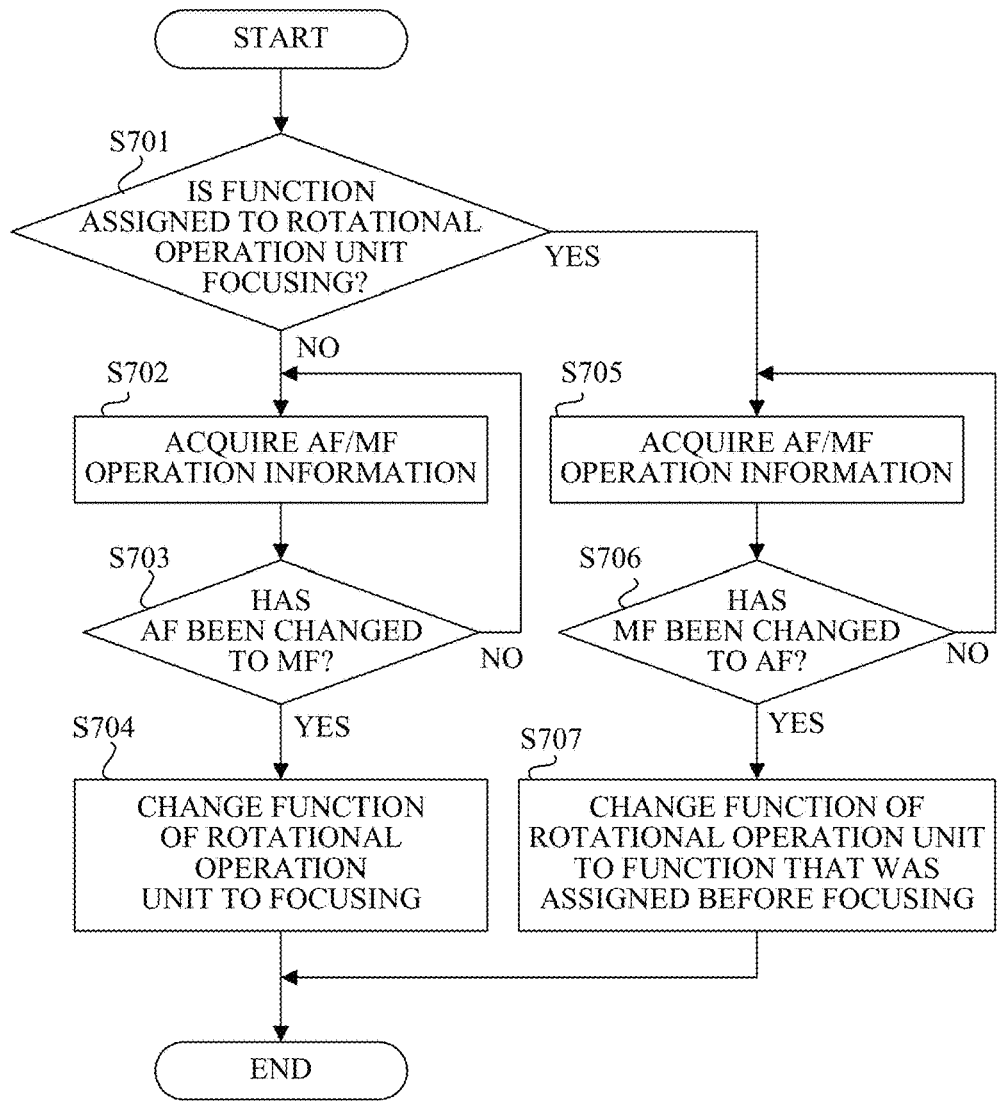
FIG. 6 illustrates a function assigned to an operation unit according to the second embodiment.
FIG. 7 is a flowchart illustrating function assigning processing according to the second embodiment.

A left side of FIG. 6 illustrates functions assignable to the rotational operation unit 120 by the function assigning unit 511 before the operation of the AF/MF selecting unit 510 (referred to as the focus selecting operation hereinafter).

A center of FIG. 6 illustrates functions to be assigned to the rotational operation unit 120 by the function assigning unit 511 when the AF is changed to the MF by the focus selecting operation. In the case where the diaphragm operation function, ISO operation function, or WB operation function is assigned to the rotational operation unit 120 in the AF and the AF is changed to the MF, the function assigning unit 511 changes the function assigned to the rotational operation unit 120 to the focusing function. On the other hand, when the focusing function is assigned to the rotational operation unit 120 in AF, the function assigning unit 511 does not change the function assigned to the rotational operation unit 120 as the focusing function even if the focus is changed to the MF.

A right side of FIG. 6 illustrates functions to be assigned to the rotational operation unit 120 by the function assigning unit 511 when the MF is changed to the AF by the focus selecting operation. In the case where the diaphragm operation function, the ISO operation function, or the WB operation function has been assigned to the rotational operation unit 120 in the MF, even if the MF is changed to the AF, the function assigning unit 511 does not change the function to be assigned to the rotational operation unit 120. On the other hand, as described above, in the MF, the focusing function is assigned to the rotational operation unit 120. In this case, when the MF is changed to the AF by the focus selecting operation, the function assigning unit 511 changes a function of the rotational operation unit 120 to the function (diaphragm, ISO or WB operation function) that was assigned before the focusing function is assigned.

A flowchart of FIG. 7 illustrates processing (control method) in which the function assigning unit 511 assigns a function to the rotational operation unit 120. The function assigning unit 511 provided in the camera CPU 100 as a computer executes this processing according to a computer program.

In the step S701, the function assigning unit 511 determines whether or not the function currently assigned to the rotational operation unit 120 is the focusing function. If the focusing function is assigned, the flow proceeds to the step S705, and if a function other than the focusing function is assigned, the flow proceeds to the step S702.

In the step S702, the function assigning unit 511 acquires the operation information on the AF/MF selecting unit 510 (information indicating whether the operation of selecting AF or MF has been performed).

In the step S703, the function assigning unit 511 determines based on the operation information on the AF/MF selecting unit 510 whether or not the focus mode used by the user has been changed from the current AF to the ME In the case where there is no change from the AF, the flow returns to the step S702, and in the case where the AF is changed to the MF, the flow proceeds to the step S704.

In the step S704, the function assigning unit 511 changes the function assigned to the rotational operation unit 120 to the focusing function. Then, this processing is terminated.

On the other hand, in the step S705, the function assigning unit 511 acquires the operation information on the AF/MF selecting unit 510.

Next, in the step S706, the function assigning unit 511 determines based on the operation information on the AF/MF selecting unit 510 whether or not the focus mode used by the user has been changed from the current MF to the AF. In the case where there is no change from the MF, the flow returns to the step S705, and in the case where the MF is changed to AF, the flow proceeds to the step S707.

In the step S707, the function assigning unit 511 changes the function to be assigned to the rotational operation unit 120 to the function that was assigned before the focusing function is assigned. Then, this processing is terminated.

When the user performs an operation of selecting use of the MF using the AF/MF selecting unit 510, this embodiment automatically assigns the focusing function to the rotational operation unit 120, considering that the user wants to use MF. It is therefore unnecessary for the user to operate the AF/MF selecting unit 510 to select the use of the MF, or to further operate the operation unit 103 to assign the focusing function to the rotational operation unit 120 through the ring function assignment setting screen. Thus, this embodiment can reduce the operational load of the user.

Each of the above embodiments has discussed the lens apparatus and the image pickup apparatus in the interchangeable lens type camera system, but a function may be assigned to the rotational operation unit as described in each embodiment in the lens-integrated image pickup apparatus.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-087551, filed on May 25, 2021, which is hereby incorporated by reference herein in its entirety.

What is claimed is:

1. An apparatus comprising:
   at least one processor;
   a memory coupled to the at least one processor storing instructions that, when executed by the at least one processor, cause the at least one processor to function as:
   a first operation member;
   an assigning unit configured to assign one of a plurality of functions to the first operation member; and
   a second operation member configured to enable a user to provide a focus lens sensitivity setting as a setting relating to a focusing function among the plurality of functions,
   wherein the assigning unit is further configured to assign the focusing function to the first operation member according to an operation of the second operation member, and
   wherein the second operation member enables the user for setting focus lens sensitivity that is a moving amount of a focus lens to a rotating amount of the second operation member when the focusing function is assigned to the first operation member.

2. The apparatus according to claim 1,
   wherein the at least one processor further functions as a selecting unit provided separately from the second operation member, wherein the assigning unit assigns a function among the plurality of functions selected by the user to the first operation member through the selecting unit.

3. The apparatus according to claim 2, wherein in a case where a function assigned to the first operation member has been changed from a function different from the focusing function to the focusing function by the operation of the second operation member, the selecting unit informs the user that the focusing function has been assigned to the first operation member.

4. The apparatus according to claim 1, wherein when the second operation member is operated while the focusing function is assigned to the first operation member by the operation of the second operation member, the assigning unit assigns the function to the first operation member that was assigned before the focusing function among the plurality of functions is assigned.

5. The apparatus according to claim 1, further comprising a lens barrel,
wherein the first operation member is a ring member rotationally operable around the lens barrel, and
wherein the second operation member is a member operable differently from a rotational operation around the lens barrel.

6. The apparatus according to claim 1,
wherein the second operation member is an operation member configured to set the moving amount of the focus lens to an operating amount of the first operation member.

7. The apparatus according to claim 1, wherein a function that is not the focusing function among the plurality of functions includes at least one of operation functions of a diaphragm, shutter speed, white balance, and ISO speed.

8. The apparatus according to claim 1, wherein the apparatus is a lens apparatus attachable to and detachable from an image pickup apparatus, and
wherein the assigning unit assigns the focusing function instructed by the image pickup apparatus to the first operation member according to the operation of the second operation member.

9. The apparatus according to claim 1, wherein the apparatus is a lens apparatus that includes an optical system and is attachable to and detachable from an image pickup apparatus or an image pickup apparatus that includes an optical system.

10. An apparatus comprising:
at least one processor;
a memory coupled to the at least one processor storing instructions that, when executed by the at least one processor, cause the at least one processor to function as:
a first operation member; and
a second operation member configured to enable a user to provide a focus lens sensitivity setting as a setting relating to a focusing function among a plurality of functions; and
a control unit configured to provide control relating to the focusing function based on an operating amount of the first operation member according to an operation of the second operation member,
wherein the second operation member enables the user for setting focus lens sensitivity that is a moving amount of a focus lens to a rotating amount of the second operation member when the focusing function is assigned to the first operation member.

11. The apparatus according to claim 10, further comprising a lens barrel,
wherein the first operation member is a ring member rotationally operable around the lens barrel, and
wherein the second operation member is a member operable differently from a rotational operation around the lens barrel.

12. The apparatus according to claim 10,
wherein the second operation member is an operation member configured to set the moving amount of the focus lens to an operating amount of the first operation member.

13. The apparatus according to claim 10,
wherein the second operation member is an operation member configured to set use of manual focus among autofocus and the manual focus.

14. The apparatus according to claim 10, wherein a function that is not the focusing function among the plurality of functions includes at least one of operation functions of a diaphragm, shutter speed, white balance, and ISO speed.

15. An image pickup apparatus attachable to and detachable from a lens apparatus,
the lens apparatus including:
at least one processor; and
a memory coupled to the at least one processor storing instructions that, when executed by the at least one processor, cause the at least one processor to function as:
a first operation member, and a second operation member operable configured to enable a user to provide a focus lens sensitivity setting as a setting relating to a focusing function among a plurality of functions, the image pickup apparatus comprising:
at least one processor;
a memory coupled to the at least one processor storing instructions that, when executed by the at least one processor, cause the at least one processor to function as:
a control unit configured to assign the focusing function to the first operation member according to an operation of the second operation member, and
wherein the second operation member enables the user for setting focus lens sensitivity that is a moving amount of a focus lens to a rotating amount of the second operation member when the focusing function is assigned to the first operation member.

16. A method of an apparatus that includes a first operation member and a second operation member, the method comprising:
assigning one of a plurality of functions to the first operation member; and
determining an operation of the second operation member configured to enable a user to provide a focus lens sensitivity setting as a setting relating to a focusing function among the plurality of functions,
wherein the assigning assigns the focusing function to the first operation member according to the operation of the second operation member, and
wherein the second operation member enables the user for setting focus lens sensitivity that is a moving amount of a focus lens to a rotating amount of the second operation member when the focusing function is assigned to the first operation member.

17. The method according to claim 16, wherein when the second operation member is operated while the focusing function is assigned to a first operation member by the operation of the second operation member, the assigning assigns the function to the first operation member that was assigned before the focusing function among the plurality of functions is assigned.

18. A non-transitory computer-readable storage medium storing a computer program that causes a computer to execute a method, the method comprising:
   assigning one of a plurality of functions to the first operation member; and
   determining an operation of the second operation member configured to enable a user to provide a focus lens sensitivity setting as a setting relating to a focusing function among the plurality of functions,
   wherein the assigning assigns the focusing function to the first operation member according to the operation of the second operation member, and
   wherein the second operation member enables the user for setting focus lens sensitivity that is a moving amount of a focus lens to a rotating amount of the second operation member when the focusing function is assigned to the first operation member.

19. The non-transitory computer-readable storage medium according to claim 18, wherein when the second operation member is operated while the focusing function is assigned to a first operation member by the operation of the second operation member, the assigning assigns the function to the first operation member that was assigned before the focusing function among the plurality of functions is assigned.

* * * * *